United States Patent Office 3,449,089
Patented June 10, 1969

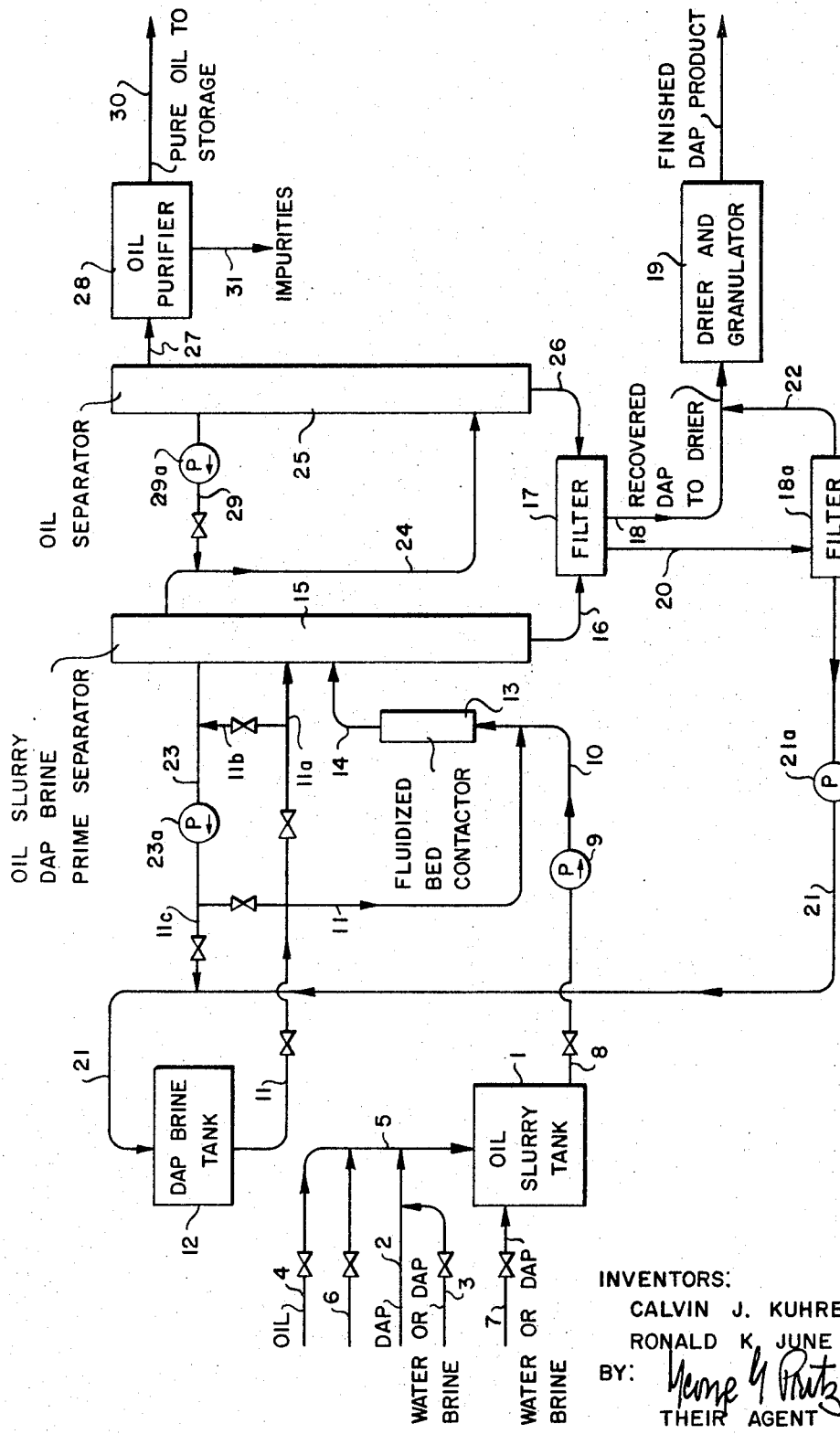

3,449,089
USE OF WATER TO IMPROVE SEPARATION OF DIAMMONIUM PHOSPHATE FROM OIL SLURRIES
Calvin J. Kuhre, Kensington, and Ronald K. June, Pleasant Hill, Calif., assignors to Shell Oil Company, New York, N.Y., a corporation of Delaware
Continuation-in-part of application Ser. No. 654,416, July 19, 1967. This application Feb. 16, 1968, Ser. No. 705,970
Int. Cl. B01j 9/22
U.S. Cl. 23—312       5 Claims

ABSTRACT OF THE DISCLOSURE

An improved method of recovering diammonium phosphate (DAP) solid particles from an oil slurry by contacting the oil slurry with an aqueous solution of an electrolyte comprising treating the diammonium phosphate solid particles with a small amount of an aqueous solution prior to, during or after the formation of the oil slurry.

CROSS-REFERENCE TO RELATED APPLICATION

This application is a continuation-in-part of copending patent application Ser. No. 654,416, filed July 19, 1967.

This invention relates to an improved method for recovery of diammonium phosphate solid particles from an oil slurry. More particularly, the present invention is directed to recovery of diammonium phosphate from hydrocarbon oils in which the diammonium phosphate salt is dispersed therein as a slurry and which on recovery the salt is essentially free of oil and the oil is free of salt.

BACKGROUND OF THE INVENTION

Phosphatic fertilizers are an important class of fertilizers most of which are naturally occurring materials such as phosphate rock which are mined and processed into desired fertilizer end products. A synthetic phosphate fertilizer which is an important plant fertilizer and additive ingredient is diammonium phosphate which is manufactured by the wet process by reacting phosphoric acid at 40–42% $P_2O_5$ with anhydrous ammonia at a temperature of about 240° F. Diammonium phosphate can be and normally is also mixed with other types of fertilizers such as sylvite, potash, potash salts, etc., for hardening these materials so as to aid in their granulation and improve their fertilizing properties.

Diammonium phosphate solids can be conveniently and economically transported over great distances through pipelines as oil slurries, which slurries can contain from 1–50% or more of diammonium phosphate in particle form dispersed in a suitable liquid hydrocarbon carrier such as crude oil or fractions thereof ranging in viscosity from light petroleum fractions in the kerosene boiling range to highly viscous oils approaching the viscosity of a heavy crude oil. The diammonium phosphate solid particles are dispersed by suitable means and may have a particle size ranging from less than 50 microns to above 5000 microns and generally are in the range of from 75 to 3000 and preferably are between 200 and 1500 microns.

Various techniques have been proposed for recovery of diammonium phosphate solid particles from a liquid hydrocarbon carrier, such as by settling or precipitation, or phase transfer and the like, which methods are described in U.S. Patent 3,365,279 and in copending application Ser. No. 465,445, filed June 21, 1965, now U.S. Patent No. 3,368,876.

Some of these techniques, however, have drawbacks such as poor separation; they are time consuming and the separated products contain impurities which must be removed before either the solids or liquid can be considered as acceptable recovered products. Thus, using settling or precipitation techniques to recover diammonium phosphate from oil, the process is time consuming and ineffective in producing pure products of acceptable standards. The use of normal phase-transfer techniques generally results in a formation of an emulsion interface which inhibits or interferes with the effective recovery of the solids. The diammonium phosphate solid product then contains substantial amounts of entrapped oil which presents a costly purification problem. The recovered oil phase also contains solid impurities which must be removed from the oil.

It is an object of the present invention to effectively separate and recover essentially oil-free diammonium phosphate from an oil slurry.

Still another object of the present invention is to prepare an oil slurry containing a substantial amount of diammonium phosphate particles dispersed therein for pipeline transportation and recovery of oil-free diammonium phosphate particles at the terminal end of the pipeline by a novel phase transfer technique.

Still another object of the present invention is to prepare an oil slurry containing diammonium phosphate solid particles and thereafter recovering the diammonium phosphate by phase transfer so that the salt is essentially free of oil and the oil free of the salt.

These and other objects will be apparent from the following description of the invention.

SUMMARY OF THE INVENTION

The present invention is directed to an improved, novel and new technique for preparing a diammonium phosphate-hydrocarbon slurry for pipeline transportation and recovering said slurry at the terminal station of the pipeline so that the solid material is essentially or wholly hydrocarbon free and the hydrocarbon, e.g., petroleum oil, is free of solids, by contacting the slurry with an aqueous solution containing an electrolyte, which may be a saturated solution, to effect a phase transfer of the diammonium phosphate from the hydrocarbon phase into the aqueous phase and thereafter separating the diammonium phosphate particles from the aqueous suspension by conventional means. The essence of the present invention resides in either prior to, during or after the formation of the slurry of the diammonium phosphate particles in a hydrocarbon carrier to admix therewith a small amount of an aqueous solution, e.g., water or diammonium phosphate, so that the slurried liquid hydrocarbon composition contains from a fraction of a percent to about 5% of water or brine and preferably between about 0.5 and about 4% water or brine based on the total solid material in the oil slurry composition. The preferred method is to pretreat the diammonium-phosphate solid material with from about 2% to about 4% water or brine and thereafter slurrying the diammonium phosphate with a liquid hydrocarbon such as a petroleum crude oil or fractions thereof. However, the diammonium phosphate can be slurried with oil and the required amount of water can be added during or after the slurry has been formulated.

By addition of a small amount of water or brine to either the diammonium phosphate particles prior to slurrying with oil or to an oil slurry containing diammonium phosphate solid particles, recovery of these diammonium phosphate particles is greatly facilitated when phase transferred into an electrolytic aqueous solution, which may be saturated, without encountering emulsion and separation difficulties and no special equipment or flow techniques are required to accomplish the separation and recovery of the diammonium phosphate particles from the aqueous phase. Thus, by pretreating the oil slurry in the manner described, the slurry and aqueous solution can be contacted under laminar or turbulent flow conditions in order to effect transfer of the diammonium phosphate material from the oil phase into the aqueous phase so that in the end of the separation of the two phases, the oil is free of diammonium phosphate and the diammonium phosphate recovered by suitable means from the aqueous electrolytic solution is oil free. Not only is effective separation of the diammonium phosphate particles from the oil into the aqueous phase efficiently accomplished by pretreating the diammonium phosphate particles with a small amount of water or brine prior to, during or after slurrying the diammonium phosphate particles with oil and thereafter contacting said slurry with the aqueous solution, but the particle size of the diammonium phosphate solids is not diminished due to attrition to unacceptably small particle size due to flow conditions encountered in conventional pipeline transportation and recovery of the diammonium phosphate from the oil slurry. Also, the use of demulsifiers normally used to break or prevent the formation of an interface emulsion can be avoided when using the process of the present invention thereby making it both more economical and more efficient.

The diammonium phosphate particle-oil slurry can contain from 1% to 75% or more percent by volume (and preferably from 20% to 50%) of the diammonium phosphate particles (50–5000 microns, preferably between 200 and 1500 microns) suspended or dispersed in the oil and the slurry can be prepared by any suitable means and which also contains from a fraction of a percent to about 5% water or brine by weight. The water- or brine-containing oil slurry is stable for transportation through pipelines over long distances.

The electrolytic aqueous fluid used in the process of the present invention can be a saturated or unsaturated water solution containing an inorganic electrolyte such as one of the alkali metal chlorides, nitrates, sulfates, phosphates or the corresponding ammonium compounds or the like and mixtures thereof of which the preferred is a saturated brine.

Under certain circumstances it may be desirable that the pH of the aqueous fluid be within the range of from 7–12 and preferably between 8–10. By controlling the pH of the aqueous solution within this range, it has been observed that by the phase transfer of the diammonium phosphate particles from the oil phase into the aqueous phase is more easily and completely accomplished than when using a neutral or acidic aqueous fluid. Thus, to effect better separation the aqueous pretreated fluid or the aqueous fluid used to effect the separation of the diammonium phosphate from the oil phase into the aqueous phase, may contain a small amount of a basic material such as alkali metal hydroxide so as to effect an adjustment in the pH of the aqueous fluid to be within the range indicated.

DESCRIPTION OF THE PREFERRED EMBODIMENTS

According to the invention, diammonium phosphate particles are pretreated before, during or after being oil slurried with a small amount of water (1–5%) and the water-modified oil slurry is brought into intimate laminar or turbulent flow contact with a saturated or unsaturated brine solution, thereby causing the transfer of the diammonium phosphate from the oil slurry to the brine phase; the latter phase is thereafter separated from the oil, e.g., by settling or centrifuging or other suitable means, and finally the diammonium phosphate particles are recovered from the brine. Brine is admixed with the slurry stream under any contacting or flow conditions for a time sufficient to effect essential, complete phase transfer of the diammonium phosphate from the oil phase to the brine phase from where the diammonium phosphate is separated and is then removed by suitable means, e.g., thickening, settling, centrifuging or filtration or a combination of these.

The residual brine may, in continuous operations, be returned to the oil contacting step for the treatment of additional oil slurry.

When the oil slurry containing the small amount of water is brought into contact with the brine under conditions described, the diammonium phosphate particles from the oil slurry readily pass into the brine phase and are removed therefrom by suitable means. The brine may consist of water in which is dissolved the same material as that being recovered from the oil slurry, namely diammonium phosphate, although other water-soluble solutes or electrolytes may be used. The brine is advantageously saturated so that the preferentially wetted material will not dissolve, although water may be added to dissolve some of the solid if brine is wanted as a product. The diammonium material recovered from the brine is substantially free from oil and subsequent washing is not necessary or a light wash is sufficient. The recovered diammonium phosphate material is readily dried by heating. The material may be reconstituted into crystals of desired size if not in proper physical form.

A preferred aqueous fluid useful for pretreatment of the diammonium phosphate as well as to effect separation of an oil slurry containing said solid material may be a saturated aqueous diammonium phosphate brine having a pH of about 8–10, preferably between about 8.5–9.5. Brine for pretreatment having the pH indicated may be obtained by adding between 0.5 and 0.7% w. of KOH and such a solution may also be used to effect phase transfer of a diammonium phosphate-oil slurry in the manner of the present invention.

Brief Description of the Drawings

The invention will be further described with reference to the accompanying drawing forming a part of this specification, the single view of which is a flow diagram of an illustrative embodiment.

Referring to the drawing, a slurry of diammonium phosphate containing 1–5% w. water was prepared and introduced into vessel 1 by admixing diammonium phosphate coming from line 2 with water or brine from valved line 3 or admixing diammonium phosphate from line 2 with oil coming from line 4 and introducing water or brine into the oil slurry into line 5 from valved line 6 or into the slurry tank 1 via valved line 7. The water-containing diammonium phosphate oil slurry formed in tank 1 is conducted via valved line 8 through pump 9 into line 10 which is in communication with valved line 11 which is connected to diammonium phosphate brine tank 12. The brine-oil slurry is conducted through a fluidized bed or phase contactor 13 and the mixture conducted via line 14 into separator or settler 15 wherein the oil and the diammonium phosphate brine solution are separated. The diammonium phosphate-brine solution is removed from the separator via line 16 and conducted into filter 17 where the diammonium phosphate is removed through line 18 and the brine pumped into line 20 from which the brine is removed via line 21 having pump 21a and conducted into the brine vessel 12 and the sylvite conducted via line 22 into line 18 and drier and granulator 19. A portion of the brine from separator 15 can be recycled via valved line 23 having pump 23a theerin and valved line 11 or, if necessary, brine from tank 12 can be introduced in the separator 15 via valved lines 11 and 11a or brine from lines 11 and 11a or introduced into line 23 via lines 11 and 11b. Also, the brine from line 23 can be recycled into line 11 or returned to the brine vessel 12 via lines 11c and 21. The oil from separator 15 can be conducted therefrom if necessary via line 24 into separator 25 where entrained brine is removed via line 26 and returned to filter 17 and oil recovered therefrom via line 27 is purified in purifier 28 and pure oil removed via line 30 to storage and impurities removed via line 31. If necessary, a portion of the oil is recycled via valved line 29 having therein pump 29a.

The reconstitution, drying and classifying of diammonium phosphate by the process of this invention is advantageous since in pipeline transportation of diammonium phosphate small particles are required to make a stable slurry for pumping through a pipeline. The recovered particles must be reconstituted for commercial use. This includes prilling, flaking, roll compaction, crystallization, agglomeration, etc. A preferred method is agglomeration of the mud by drying.

Moistened salts (mud) can often be agglomerated into spherical pellets on an inclined rotary drum or pan. The size of the pellets is dependent largely on the moisture content of the mud. The agglomerated mud can be dried in an oven to produce reasonably hard and strong pellets. Of the various techniques for making large particles, the agglomeration of the mud appeared to be the most desirable for use in connection with the phase transfer method of separating the slurry using laminar flow techniques of the present invention.

Thus, the diammonium phosphate mud recovered from filters 17 and 18 can be agglomerated quite readily. The mud from these filters can be placed on a belt, then dried and crushed to produce rough-edged agglomerates. When the mud is cast into forms, it can be recovered in almost any shape and size desired. The mud can be tumbled in rotary driers to yield particles ranging from marble-like spheres to small pellets. Reconstitution of the solids into pellets (granules, nodules, etc.) for fertilizer use is desirable. Pellets have inherent strength due to shape, show good dry flow characteristics (flow easily when handled by mechanical equipment), and resist segregation when mixed with other pelletized fertilizer ingredients. Furthermore, pellets allow the incorporation or other nutrients therein so as to produce a balanced fertilizer.

The invention is further illustrated by the following example.

Diammonium phosphate was pretreated with 2% saturated diammonium phosphate brine and thereafter slurried with oil to form a 40% diammonium phosphate-oil slurry. The slurry was contacted under turbulent flow conditions with brine in the ratio of about 1:1. Thereafter the mixture was allowed to separate into an oil phase and brine phase which contained essentially all of the diammonium phosphate therein. The diammonium phosphate was recovered from the brine phase by filtration, then dried. The recovered diammonium phosphate contained essentially no oil. The oil phase was essentially free of brine. The process was repeated in which the oil slurry was formed without pretreating it with 2% saturated diammonium phosphate brine and on similar phase separation the diammonium phosphate contained a substantial amount of oil (0.67%) and the oil contained some brine (1.73%). These figures illustrate the significance of the presence of a small amount of diammonium phosphate brine in the oil slurry so as to obtain both pure diammonium phosphate and oil product by the process of the present invention.

The foregoing description of the invention is merely intended to be explanatory thereof. Various changes in the details of the method may be made, within the scope of the appended claims, without departing from the spirit of the invention.

We claim as our invention:

1. A method of recovering diammonium phosphate solid particles from an oil slurry, comprising:
   slurrying from 1 to 75% of diammonium phosphate solid particles with oil, said slurry mixture containing from a fraction of one percent to about 5% of an aqueous solution;
   contacting the aqueous solution containing oil slurry with a saturated aqueous solution containing an electrolyte to effect phase transfer of the ammonium phosphate solid particles from the oil phase to the aqueous phase;
   separating the two phases; and,
   recovering the diammonium phosphate solid particles from the electrolytic saturated aqueous phase.

2. The method of claim 1 wherein the saturated aqueous electrolyte solution is saturated diammonium phosphate brine.

3. The method of claim 1 wherein the oil slurry contains at least 40% of said diammonium phosphate.

4. The method of claim 1 wherein the diammonium phosphate solid particles prior to being slurried with oil are pretreated with from 0.5–5% water.

5. The method of claim 1 wherein the diammonium phosphate solid particles prior to being slurried with oil are pretreated with from 0.5–5% saturated ammonium phosphate brine.

References Cited

UNITED STATES PATENTS

| 2,140,574 | 12/1938 | Cerf | 208—284 X |
| 2,446,040 | 7/1948 | Blair | 208—298 X |
| 3,378,363 | 4/1968 | Titus | 71—64 |

MICHAEL E. RODGERS, *Primary Examiner.*

U.S. Cl. X.R.

23—106; 71—64